US006975209B2

(12) United States Patent
Gromov

(10) Patent No.: US 6,975,209 B2
(45) Date of Patent: Dec. 13, 2005

(54) IN-LINE POWER TAP DEVICE FOR ETHERNET DATA SIGNAL

(75) Inventor: Leonid G. Gromov, Mountain View, CA (US)

(73) Assignee: Finisar Corporation, Sunnyvale, CA (US)

( * ) Notice: Subject to any disclaimer, the term of this patent is extended or adjusted under 35 U.S.C. 154(b) by 731 days.

(21) Appl. No.: 10/135,783

(22) Filed: Apr. 30, 2002

(65) Prior Publication Data

US 2002/0180592 A1 Dec. 5, 2002

Related U.S. Application Data

(60) Provisional application No. 60/288,981, filed on May 3, 2001, provisional application No. 60/287,883, filed on Apr. 30, 2001.

(51) Int. Cl.[7] .................. H04M 11/04; H04M 1/00; H04L 1/00
(52) U.S. Cl. ................ 340/310.01; 340/310.08; 379/413; 379/413.02; 379/322; 379/900; 370/241; 370/463; 709/218
(58) Field of Search .............. 340/310.01–310.08; 379/412, 413, 413.02, 413.03, 413.04, 322, 379/323, 900, 324; 370/241, 463, 241.1, 370/901, 908; 709/217, 218, 250

(56) References Cited

U.S. PATENT DOCUMENTS

| | | | |
|---|---|---|---|
| 5,406,260 A | 4/1995 | Cummings et al. | 340/568 |
| 5,491,402 A | 2/1996 | Small | 323/282 |
| 5,878,030 A | 3/1999 | Norris | 370/241 |
| 5,994,998 A | 11/1999 | Fisher et al. | |
| 6,115,468 A | 9/2000 | De Nicolo | 379/413 |
| 6,140,911 A | 10/2000 | Fisher et al. | 340/310.01 |
| 6,141,763 A | 10/2000 | Smith et al. | 713/300 |
| 6,218,930 B1 | 4/2001 | Katzenberg et al. | 340/310.01 |
| 6,233,613 B1 | 5/2001 | Walker et al. | |
| 6,424,627 B1 * | 7/2002 | Sorhaug et al. | 370/241 |
| 6,541,878 B1 | 4/2003 | Diab | |
| 6,650,622 B1 * | 11/2003 | Austerman et al. | 370/241 |

* cited by examiner

Primary Examiner—Donnie L. Crosland
(74) Attorney, Agent, or Firm—Workman Nydegger

(57) ABSTRACT

An in-line power tap device that can be deployed in a data communication network in which two ports of the in-line power tap device are interchangeably coupled between any two communicating nodes to pass in-line power and data signals. The in-line power tap device also has a pair of tap ports that are coupled to external analyzers to monitor the quality of data signals without interrupting the on-going communication between the two communicating nodes. The apparatus allows one to tap into an Ethernet unshielded twisted pair data transmission line, or other source of data transmission, without disturbing the in-line power transmission and to maintain the integrity of data transmitted.

22 Claims, 5 Drawing Sheets

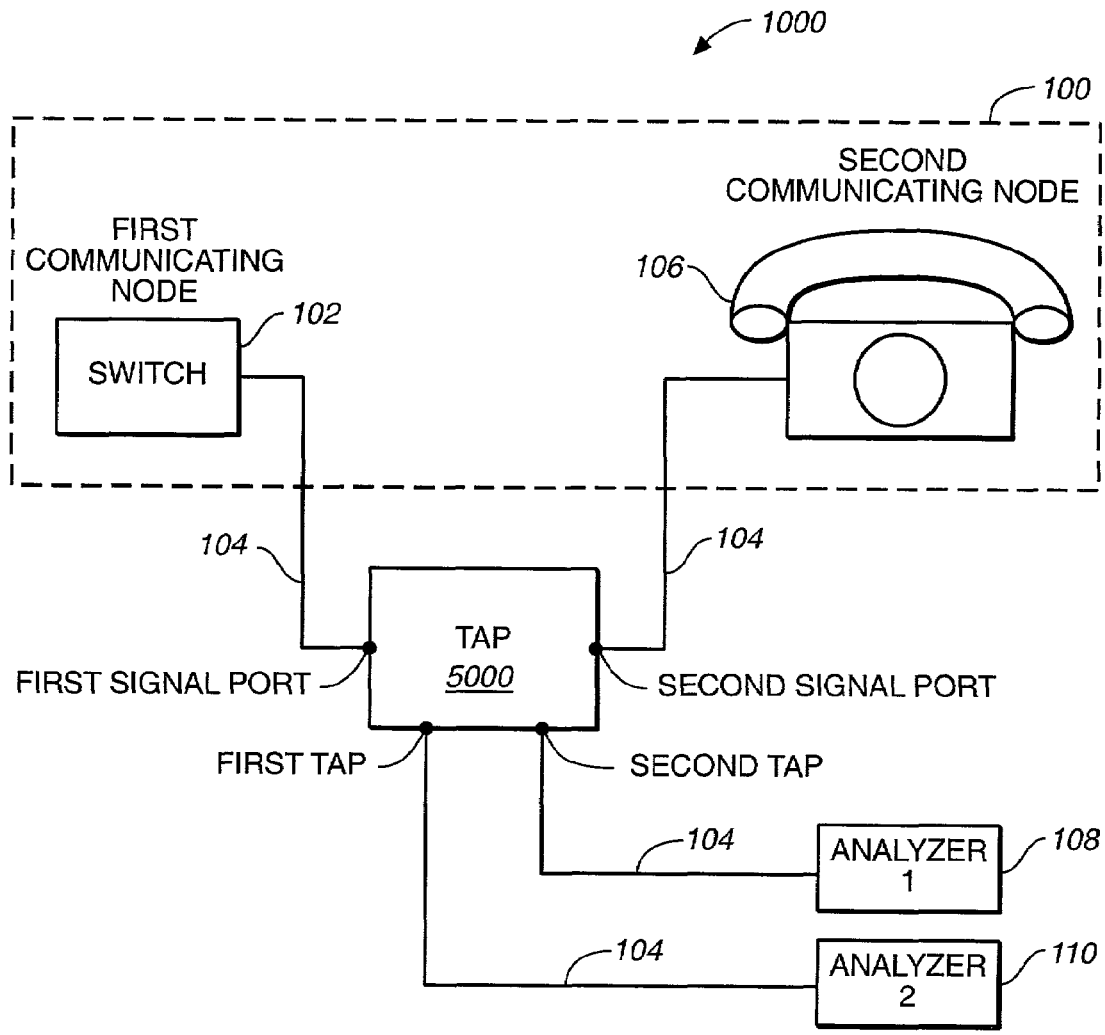
FIG._1
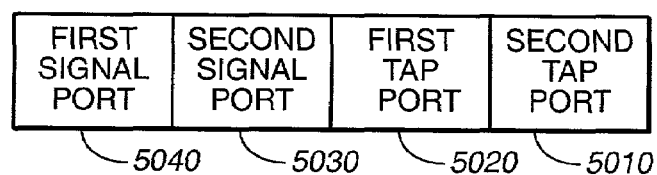
FIG._2

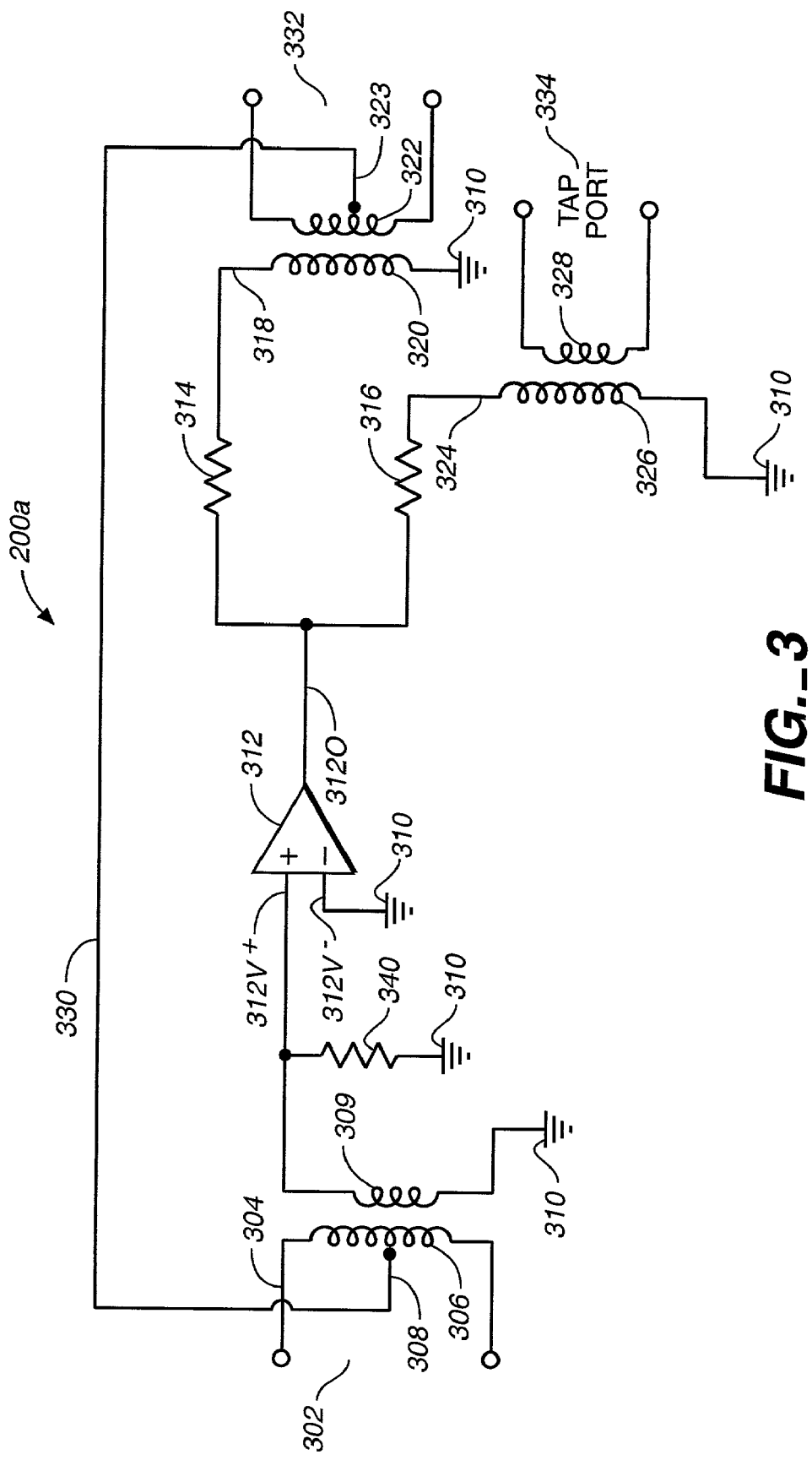
FIG._3

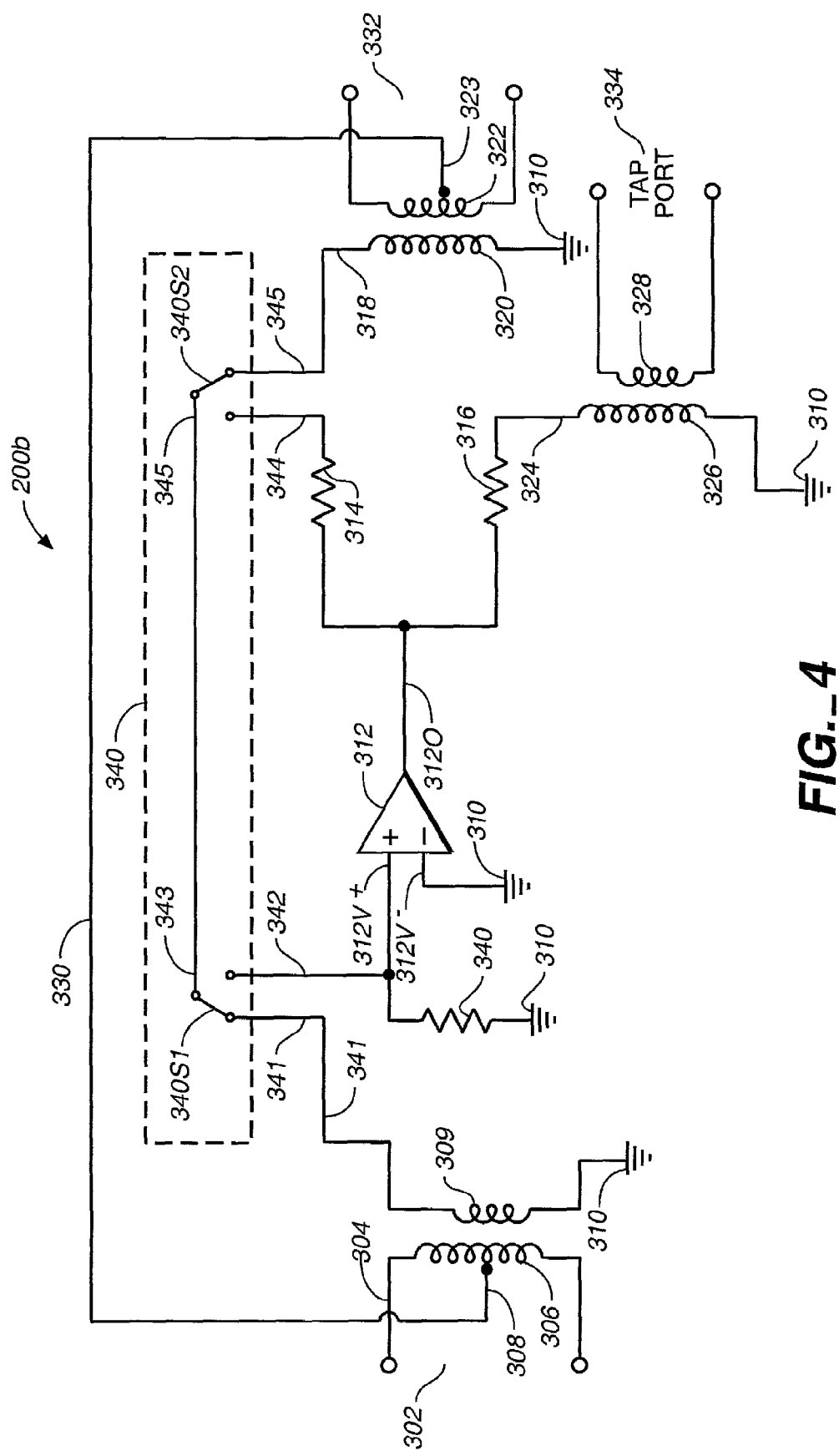
FIG._4

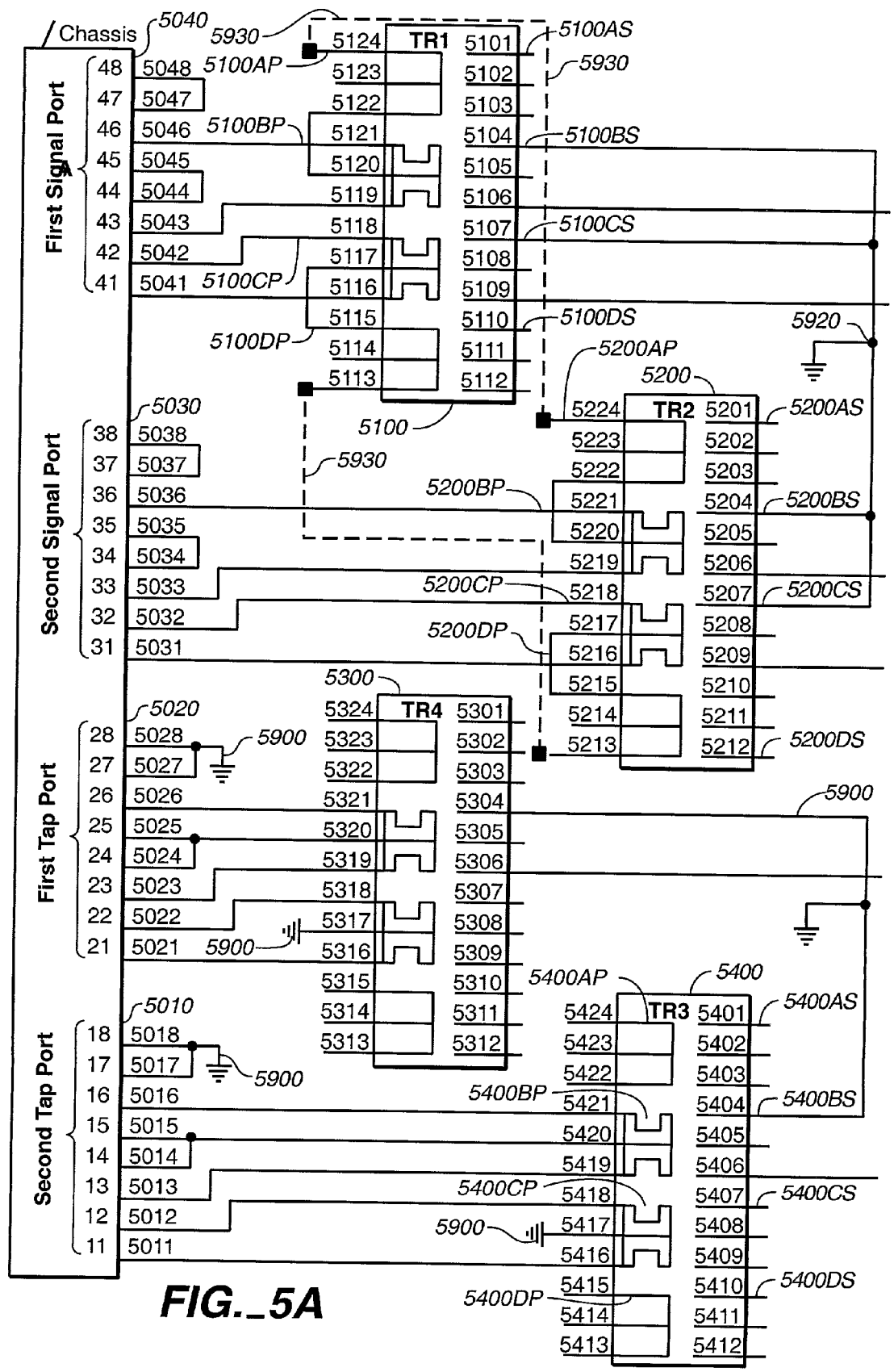
FIG._5A

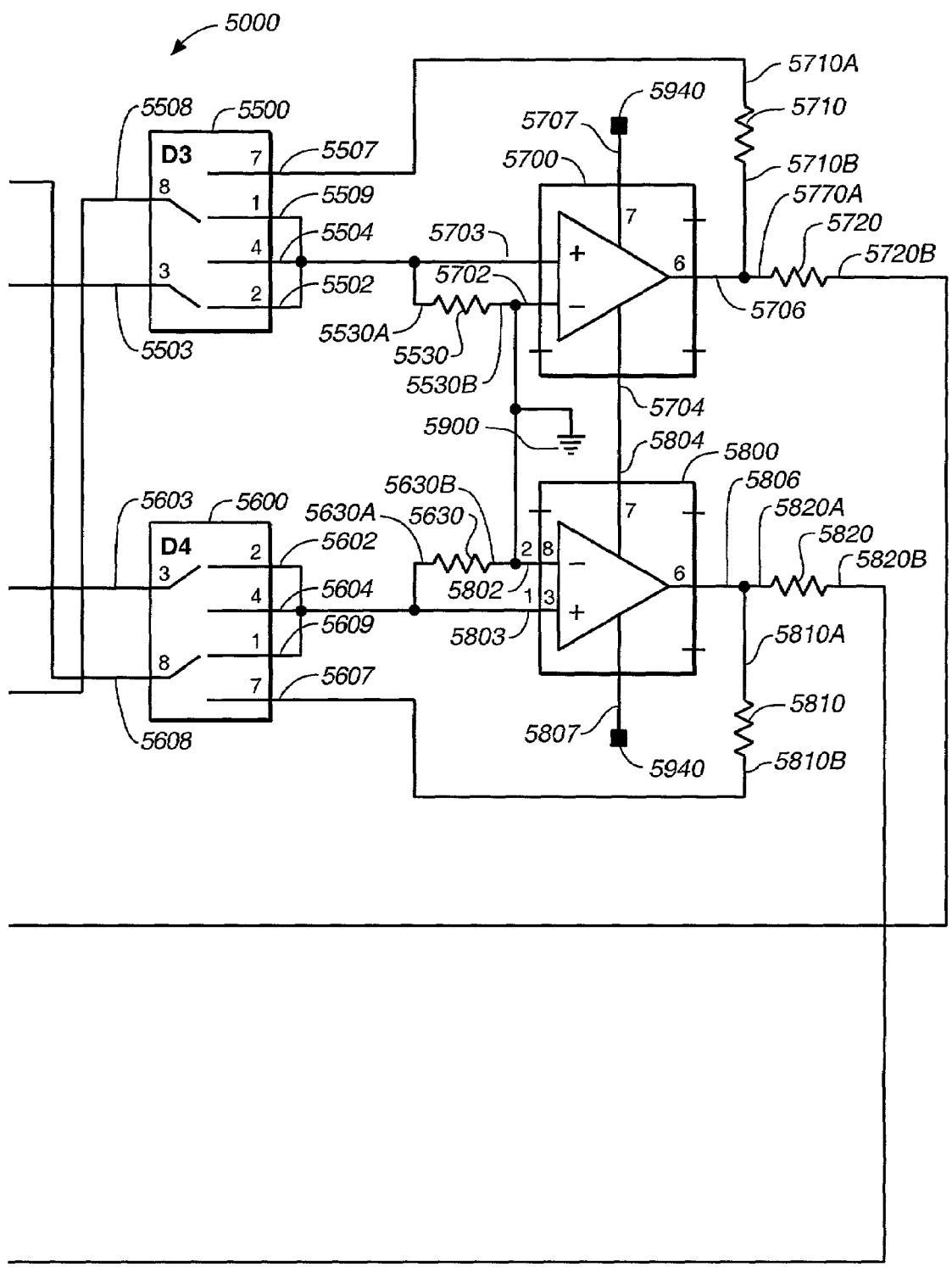
FIG._5B
FIG._5  FIG._5A | FIG._5B

IN-LINE POWER TAP DEVICE FOR ETHERNET DATA SIGNAL

CROSS REFERENCE TO RELATED APPLICATION

This application claims the benefit of two prior filed provisional applications: provisional application Ser. No. 60/287,883, filed on Apr. 30, 2001 and provisional application Ser. No. 60/288,981, filed on May 3, 2001.

FIELD OF THE INVENTION

This invention broadly relates to data communication. More particularly, the invention relates to an apparatus that passes electrical power and monitors data signals of a data communication network.

BACKGROUND OF THE INVENTION

The explosive growth of the Internet, E-commerce, business critical network applications, and the convergence of voice, video and data, has made network performance and reliability central to the successes of most companies. Many companies today transmit and receive important data signals over the Ethernet data communication networks. An Ethernet communication network comprises a hub or PBX (private branch exchange) coupled to a channel and to many stations. The PBX receives data signals from stations and connects stations that are in communication with one another. Usually, in an Ethernet data communication network, backup electrical power is provided at each network center, but not at each local station because the cost to provide backup electrical power at each station is prohibitive. When companies are in the process of communicating to one another, power failure or even a brief power blackout would cause loss of critical information and great damage. Ethernet data communication networks follow the IEEE 802.3 standard in which electrical power is provided in-line with the data signals. The IEEE 802.3 standard requires that the Ethernet data communication networks use UTP (unshielded twisted pair) cables to transport data signals and electrical power together to provide power and data signals to each station. A similar arrangement exists for telephone loops from a central office.

To guarantee the reliability and quality of the data signals in an IEEE 802.3 af UTP Ethernet data communications link, engineers and technicians need to monitor the data signals and the electrical power of each communication port without disturbing the ongoing communication process of that port. To achieve that goal, engineers and technicians have to disconnect a port and insert in its place a measuring instrument to monitor the quality and reliability of that particular port, thus interrupting the communication process of that port. In addition, when a channel port is disconnected, electrical power to the station is also disconnected.

Therefore, there is a need for an apparatus that can provide electrical power to Ethernet data communication networks and to monitor the data signal quality of such networks without disturbing the communication process between stations.

There have been many attempts to solve and improve in-line power for signal activities for Ethernet data communication links, but none provides both the in-line power and monitoring signals at the same time without disturbing the communication process. In the U.S. Pat. No. 6,115,468 entitled "Power Feed for Ethernet Telephones Via Ethernet Link" by Maurillio Tazio De Dicolo (hereinafter '468 patent'), the inventor discloses an Ethernet device power transmission system that includes an input transformer, an output transformer, and a pair of twisted pair conductors. The input transformer includes a pair of primary windings for connection to a source Ethernet data, and a pair of secondary windings for connection to the Ethernet telephone line. Each transformer has a center tap. A first twisted pair conductor is connected across the first secondary, a second twisted pair conductor is connected across the second secondary and a DC-bias is provided between respective center taps of the first and second secondary. At the local end, an output transformer includes a first and a second center-tapped primary and a first and secondary connection to the load device. The first and second primary center taps are connected to a power processor for extraction of DC power. The '468 patent provides DC electrical power to the Ethernet line and overcomes the problem of net current flow that limits the choice of wire gauge. In this invention, the power is split into separate transmitting and receiving lines; and therefore, the power delivered to the load device is split equally over four wires. However, the invention in '468 patent does not monitor signal activities at the port; it only provides power for Ethernet telephones via an Ethernet link. In addition, each load of the apparatus described in the '468 patent needs a separate power processor, making this invention bulky and expensive.

Another attempt to solve signal monitoring and electrical power supply problems in an Ethernet data communication system is provided by U.S. Pat. No. 6,218,930 entitled "Apparatus and Method for Remotely Powering Access Equipment Over a 10/100 Switched Ethernet Network" by Boris Katzenberg, and Joseph A. Deptulla, (hereinafter '930 patent). The invention described in the '930 patent discloses an apparatus and method for remotely powering access equipment over a 10/100 switched Ethernet network comprising an Ethernet switch card with a phantom power supply for remote access equipment and added circuitry for automatic detection of remote equipment being connected to the network. The apparatus described in the '930 patent can only sense whether there is a remote apparatus connected to the system and provides a phantom power supply thereto. However, it cannot monitor the consistency of the power supply of a remote device and signal activities of a port. In other words, once the apparatus of the '930 patent detects a remote device and provides phantom power thereto, it cannot monitor whether there is a temporary power surge or not. When the power surge is sufficiently large, the apparatus of the '930 patent may mistakenly determine that the device has been disconnected and cut off the power to it. This may damage the remote device and cause a loss of critical signals. Finally, the apparatus of the '930 patent cannot monitor the data signals and the electrical power supply of the remote station.

Yet another attempt to solve the signal monitoring and electrical power supply problem for the Ethernet data communication system is found in the U.S. Pat. No. 6,140,911 entitled "Power Transfer Apparatus for Concurrently Transmitting Data and Power Over Data Wires" by David A. Fisher (hereinafter '911 patent). This invention provides an electric power supply to a network device across a transmission line. The patent discloses use of an electrical supply current sufficient to power a wireless access point. Power is transmitted concurrently with a network data signal across a transmission line. A power and data coupler couples the network data input and a power input respectively, and transmits the coupled signal, to a distance of three meters or more, over the transmission line to a power and data coupler. The power and data decoupler separates the power signal from the network data signal and supplies those signals to a power output port and a data output port, respectively, for use by a wireless access node. The power signal may be modulated at a low frequency relative to the frequency of the data signal. The electrical supply current of the invention described in the '911 patent does not tap into an in-line power supply to monitor and maintain a constant electrical power supply.

In conclusion, prior art technologies have improved in-line power supply problems. However, the prior art does not provide both an in-line DC electrical power supply to the Ethernet communication network and a monitor for data signals at the same time without disturbing the communication process. Accordingly, it is the object of the present invention to provide an apparatus that can provide both an in-line power supply and a monitor for data signals of an Ethernet data communication network without disturbing the communication process of such system.

SUMMARY OF THE INVENTION

The above object has been achieved by an in-line power tap device for monitoring data signals and allowing DC electrical power to go through a data communication network uninterrupted. The in-line power tap device comprises a plurality of signal ports coupled to communicating nodes of the data communication network, at least one tap port coupled to a plurality of signal ports for monitoring data signals, means for transmitting the data signals, and means for passing the DC power between signal ports. The data signals are transmitted between the pins of the plurality of the signal ports and monitored on the pins of at least one tap port, and the DC power is passed through on a separate power line between the plurality of the signal ports inside a tap port. In one embodiment of the present invention, the means for transmitting the data signals comprises a plurality of input transformers, a plurality of amplifiers, a plurality of output transformers, and a plurality of tap transformers.

In another embodiment of the invention, the means for transmitting the data signals includes a plurality of relays coupled to input transformers. The input transformers are coupled to a plurality of amplifiers, which are coupled to a plurality of output transformers to transmit data signals in a network. The device also monitors data signals without disturbing the in-line power transmission and maintains the integrity of the signal data transmitted.

BRIEF DESCRIPTION OF THE DRAWINGS

FIG. 1 is a block diagram of a communication system having a full duplex in-line power tap device coupled to a data communication network and analyzers for passing in-line power to the data communication network and for monitoring data signals thereof.

FIG. 2 illustrates a front panel of a full duplex in-line tap power device with four ports: a first signal port, second signal port, a first tap port, and a second tap port.

FIG. 3 is a schematic diagram of a first embodiment of the half duplex in-line power tap device.

FIG. 4 is a schematic diagram of a second embodiment of the half duplex in-line power tap device.

FIG. 5, consisting of FIGS. 5A and 5B, is a schematic diagram of an embodiment of the full-duplex in-line power tap device.

DESCRIPTION OF THE PREFERRED EMBODIMENT

FIG. 1 illustrates a communication system 1000 in which the in-line power tap device 5000 is coupled to a data communication network 100 to monitor data signals and to pass electrical power thereto. The system 1000 includes a data communication network 100, the in-line power tap device 5000, a first analyzer 108, and a second analyzer 110 coupled to the in-line power tap device 5000 to monitor the data signals and pass in-line power. The data communication network 100 is well known to a person of ordinary skill in the pertinent art. Examples of the data communication network 100 are Ethernet, local area network (LAN), or an internet system. The in-line power tap device 5000 is deployed between two communicating nodes of an Ethernet data communication network to monitor data signals and pass along the in-line power. Generally, the Ethernet data communication network 100 includes at least one first communicating node 102, a plurality of channels 104, and at least one second communicating node 106. The system 1000 in FIG. 1 only shows two communicating nodes of the network 100 because the analysis of these two communicating nodes is sufficient to understand the whole system. In an Ethernet data communication network, the first communicating node 102 can be a hub or a switching network (switch) such as PBX (personal branch exchange) that connects an incoming signal to a particular destination. It is well known in the data communication art that the first communicating node 102 is represented by one switch as shown in FIG. 1. The first communicating node 102 has two states of either ON or OFF. When the first communicating node 102 is ON, data signals are transmitted to the second communicating node 106 via the medium 104. Conversely, when the first communicating node 102 is OFF, no data signal is transmitted.

The medium 104 can be coaxial, unshielded twisted pair (UTP), or shielded twisted pair (STP) cables. In an Ethernet data communication, a 10 Base-T cable is commonly used. Typically, the length of a 10 Base-T cable can be up to 100 meters from the first communicating node 102 to the second communicating node 106, and the rate of data transfer is 10 Mbps. Faster Ethernet version with a 100 Mbps uses 100B-X and 100 Base-FX. Both 10Base-T and 100Base-TX copper cables can be either UTP or STP. In the preferred embodiment, the full duplex in-line power tap device 5000 uses UTP cables for both 10 Mbps and 100 Mbps speed, or in short, Ethernet 10/100. In a typical Ethernet data communication, the second communicating node 106 are linked into the first communicating node 102 by four pairs of category 5 cable. As discussed above, a category 5 cable has four unshielded twisted pairs of wires, or a total of 8 wires unshielded twisted-pair cable terminating each end in a RJ-45 much like a telephone jack.

The second communicating node 106 can be a data terminal equipment (DTE) such as a IT telephone, a computer station or a data communicating equipment (DCE) such as, a meter, a switch, or a hub.

The in-line power tap device 5000 is a device that provides a way of directly viewing traffic on a full-duplex 10/100 Ethernet segment from the first analyzer 108 and the second analyzer 110. Typically, the in-line power tap device 5000 is deployed on a critical link between two communicating nodes in the network 100 where network monitoring and analysis are important.

In a multi-channel Ethernet data communication system, the first and second analyzers 108 and 110 can be coupled to the in-line power tap device 5000 to collect data from any communicating nodes of the data communicating network 100. The propagation of an in-line power between two communicating nodes 102 and 106 is performed in accordance with the IEEE 802.3 af which is an Ethernet protocol standard for applying DC power to Ethernet devices via a Medium Dependent Interface (MDI) to guarantee the interoperability between devices.

Therefore, FIG. 1 shows that the in-line power tap device 5000 can both pass an in-line power to the Ethernet data communication system 100 and monitor the data signals at the same time.

With reference to FIG. 2, the in-line power tap device 5000 includes four ports: a first signal port 5040, a second signal port 5030, a first tap port 5020, and a second tap port 5010. All ports, 5040, 5030, 5020, and 5010, of the device 5000 preferably use a RJ-45 type connector that resembles a telephone connector. The RJ-45 type connector is described in the Ethernet (IEEE 802.3) standard for Local Area Networks (LANs). The device 5000 is coupled to an Ethernet data communication system 100 between any communicating nodes to pass in-line electrical power, transmit and monitor data signals. The in-line power tap device 5000 comprises a plurality of signals ports that can be coupled to the first communicating node 102 at the signal port 5040 and to the second communicating node 106 at the second signal port 5030 of the Ethernet data communication network 100. The first signal port 5040 and the second signal port 5030 provide means for transmitting data signals between the first communicating node 102 and the second communicating node 106. The first tap port 5020 is coupled to the first analyzer 108 and the second tap port 5010 is coupled to the second analyzer 110 for monitoring data signals. Conversely, the first signal port 5040 of the in-line power 5000 can also connect to the second communicating node 106, and the second signal port 5030 can connect to the first communicating node 102 but the wiring within the connector RJ-45 has to be changed accordingly. The power tap device 5000 described above is a full-duplex device comprised of two half duplex in-line power tap devices. Each half-duplex device is responsible for one direction of communication. The internal structure of a half duplex in-line power tap device 200*a* is described in FIG. 3.

With reference to FIG. 3, the in-line power tap device 200 passes an in-line power between the input and output transformers. The first communicating node 102 is coupled to the device 200*a* at a first signal transformer, and the station 106 is coupled to the device 200 at a second signal transformer. A power line coupled to the center taps of the first and second transformers to pass the in-line power between the first communicating node 102 and the second communicating node 106. Data signals of the Ethernet system 100 can be monitored at a tap transformer. With this arrangement the device 200*a* can monitor data signals without taking up a router port and allow an in-line power to pass from the router to network device or any two communicating nodes without interrupting the transmission of data signals.

The in-line power device 200 comprises a first signal port 302; a first signal transformer 304 with a primary coil 306, a center tap 308, and a secondary coil 309; an electrical ground terminal 310; an op-amp 312 having a negative input terminal 312V−, a positive input terminal 312V+, and an output terminal 3120; an output resistor 340; an output resistor 314; a tap-port resistor 316; a second transformer 318 with a primary coil 320, a center tap 323, and a secondary lead 322; a tap-port transformer 324 with a primary coil 326 and a secondary coil 328; a power line 330; a destination port 332; and a tap port 334. The in-line power tap device 200 monitors the data signal at the tap-port 334, and passes an in-line power in between both first signal and second signal ports via the power line 330 at the center tap 308 and 323 of the input transformer 304 and the output transformer 318 respectively.

The first signal transformer 304 is a center-tapped transformer having a primary coil 306 for connection to a communicating node of Ethernet data communication system. As described in FIG. 2, either first signal port 210 or second signal port 220 can be coupled to the primary coil 306 of the first signal transformer 304. One end of the secondary coil is coupled to an electrical ground 310. The center tap 308 of the first signal transformer 304 is coupled to an the power line 330. The other end of the secondary coil 309 is coupled to the positive input terminal 312V+ of the op-amp 312. One terminal of the input resistor 340 is coupled to the positive input terminal 312V+ of the op-amp 312. The negative input terminal 312V− of the op-amp 312 is coupled to the electrical ground 310. In a preferred embodiment, the op-amp 312 has a gain of 2 or 3 dB. The output terminal 3120 of the op-amp 312 is coupled to the output resistor 314 and the tap resistor 316. Thus, the output 3120 of the op-amp 312 is split into two different ports: one port is for the second signal port 332, and the other is for the tap port 334. The second signal port 332 is coupled to the second signal transformer 318, and the tap port 334 is coupled to the tap transformer 324. One terminal of the primary coil 320 of the second signal transformer 318 is coupled to the output resistor 314, and the other terminal is coupled to the electrical ground 310. The secondary coil 322 of the transformer 318 is coupled to the second signal port 332. Like the first signal port 302, the second signal port 332 is a two-wired conductor of a RJ-45 type connector. One end of the primary coil 326 of the tap transformer 324 is coupled to one end of the tap resistor 316 while the other end of the primary coil 326 is grounded. The other end of the tap resistor 316 is coupled to the output 3120 of the op-amp 312. The secondary coil 328 of the tap transformer 324 is coupled to the tap port 334. The in-line power is passed between to the center taps 208 and 323 of the first signal 302 and second signal port 332 via the power line 330.

Referring to both FIGS. 1 and 3, when the half duplex in-line power tap device 200 is coupled to the data communication network 100 to pass an in-line power and to monitor signal activities of the network segment 100, the first signal port 302 is coupled to the first communicating node 102, the second signal port 332 is coupled to the second communicating node 106, and the tap port 334 is coupled to the first analyzer 108. As mentioned above, the first communicating node 102 can also connect to the second signal port 332 and the second communicating node 306 can connect to the first communicating node 102 and the analysis is the same. When the first communicating node 102 is closed or ON, i.e., when there is a data signal transmitted through the medium 104 to the second communicating node 106, the transformer 304 couples the data signal into its secondary coil 309 and feeds it to the positive input terminal 312V+ of the op-amps amplifier 312. The first signal transformer 302 has the primary to secondary ratio (PTSR) of 1. Therefore, at the positive input 312V+ of the op-amp 312, the amplitude of the data signal remains the same. At the output 312VO of the op-amp 312, the data signal is amplified by a factor of 2 because the gain of the op-amp amplifier 312 is set at 3 dB. At the output 3120 of the op-amp 312, the data signal is split into two signals with the same amplitude, one signal to the second signal port 332 and the other signal to the tap port 334. At the second signal or output path, the data signal is coupled to the secondary coil 322 of the second signal transformer 318. The second signal transformer 318 and the tap port transformer 324 both have the PTSR of 1. Because the center tap 322 of the second signal transformer 318 is connected to the power line 330, the second signal port 332 includes the data signal and the in-line power. Thus, the half duplex in-line power tap device 200a passes an in-line power in between two communicating node of the IEEE Ethernet network segment 100 in accordance with the 802.3 af standard. At the tap port 334, data signals can be monitored without disturbing the data transmission between the first communicating node 102 and the second communicating node 106.

Thus, as shown above in FIG. 3, the half duplex in-line power tap device 200a passes the in-line power between the first communicating node 102 and the second communicating node 106 along with the data signal without disturbing the transmission in the medium 104. In addition, the data signal can be monitored independently from the tap port 334.

FIG. 4 illustrates another embodiment of the present invention. This alternative embodiment 200b is similar to the first embodiment shown in FIG. 3 except that a relay is added to the circuitry of the in-line power device 200a to allow the communication of data signals continue when the amplifier's power fails. A delay would bypass the amplifier and feed the data signals to the second signal transformer when the amplifier is down. Without this delay, a powerless amplifier would significantly hinder the data transmission of the system 100. Therefore, a relay would help passing data signals from the first signal port to the second signal port in case the power source of the amplifier fails.

In reference to FIG. 4, the relay 340 has a power-up state and a power-down state. In the power-up state the relay 340 is connected to the amplifier 312 and behaves exactly as described in FIG. 3 above. However, in the power-down state, the relay 340 bypasses the amplifier and feeds the data signals from the first signal transformer 306 to the second signal transformer. 312. In order to achieve this goal, the relay 340 comprises two single-pole double-throw switches (SPDT) switches. A first SPDT switch 340S1 includes one input terminal 341 and two output 342 and 343. The input 341 is connected to the first lead of the secondary coil 309 of the first signal transformer 304. The first output 342 is connected to the positive terminal 312V+ of the op-amp 312. The second SPDT switch 340S2 includes an input 344 coupled to the primary coil of 320 of the second signal transformer 318, a first output 345 coupled to the second terminal of the signal resistor 314. The second output 343 of the first SPDT switch 340S1 is connected to a second output terminal 346 of the second switch 340S2. The switching of the relay 340 is controlled by the power source of the amplifier 312. When the power source of the amplifier 312 is ON, the first SPDT switch 340S1 and the second SPDT switch 340S2 switch to their first output terminal positions 342 and 345 respectively, connecting to amplifier 312 to the first signal port 302 and the second signal port 332 and the device 200b works similarly to the device 200a described in FIG. 3.

When the power source of the amplifier 312 fails, the first SPDT switch 340S1 and the second SPDT switch 340S2 switch to their second output terminal positions 343 and 346 respectively, bypassing the failed amplifier 312. In this case the relay 340 connects the first signal port 302 directly to the second signal port 332.

The above description illustrates the principle of operation of the half duplex in-line power tap device in two different embodiments. In one embodiment, the device 200b has a relay so that it can be set to bypass the op-amp in the event that the power source of the op-amp fails. Thus, the device 200b always operates even when the power to the amplifier 312 fails. Alternatively, in another embodiment 200a, the relay can be omitted.

FIG. 5 illustrates a detailed schematic diagram of an in-line power tap device having two channels for monitoring an Ethernet data communication network. In principle, the two-channel in-line power tap device 5000 works similar to the combination of the one-channel device 200b, as described in FIG. 4 above. Each device 200b is communicating with the system 100 in one direction. The data communication from the first communicating node 102 to the second communicating node 106 as shown in FIG. 4 is exactly the same as that from the second communicating node 106 to the first communicating node 102. A in-line power is passed along a power line between two communicating nodes of the full duplex Ethernet data communication network; whereas the data signals are transmitted between two communicating nodes and are monitored separately at the tap ports. The duplex in-line power tap device 5000 comprises two one-channel in-line power tap devices with the relay option 200b put together in opposite direction. Thus, the in-line power tap device 5000 always communicating works in full duplex communication: in a TRANS+/RECEIV+, the first node transmits the second node receives. In the TRANS−/RECEIV− communicating, the communication is in the opposite direction from the second node to the first node.

Turning to FIG. 5, the full duplex in-line power tap device 5000 comprises a first signal port 5040, a second signal port 5030, a first tap port 5020, a second tap port 5010, first signal transformer 5100, second signal transformer 5200, a first tap-transformer 5300, a second tap-transformer 5400, a first relay 5500, a second relay 5600, a first op-amp 5700, a second op-amp 5800, an electrical ground 5900, a in-line power line 5930, and a power source 5940 for the op-amps and the relays.

The first signal port 5040 is the IEEE 802.3 standard-type connector with 8 pins: pins 5041 through 5048. The pin 5047 is connected to pin 5048 and to the DC electrical power line 5930. The pin 5044 is connected to pin 5045. The electrical ground 5900 is preferably coupled to the chassis of the in-line power tap device 5000. The second signal port 5030 comprises 8 pins 5031 to 5038 and has the same connection configuration among pins as the first signal port 5040. Pin 5037 is connected to pin 5038 and to the DC electrical power line 5930. The power line 5930 is preferably a power trace in a printed circuit board (PCB) connecting the first signal port 5040, the second signal port 5030. The pin 5034 is connected to pin 5035.

The first tap port 5020 is also an IEEE 802.3 RJ-45 type connector with 8 pins: pins 5021 through 5028. The pin 5027 is connected to pin 5028 and to the electrical ground 5900. Pin 5024 is connected to pin 5025. The second tap port 5010 comprises 8 pins 5011 to 5018 and has the same connection configuration among pins as the tap port A 5020. The pin 5017 is connected to pin 5018 and to the electrical ground 5900. Pin 5014 is connected to pin 5015.

The first signal transformer 5100 is an IC type transformer that has 24 pins and contains four center-tapped transformers 5100A, 5100B, 5100C, and 5100D, respectively. The pin-out arrangement of the first signal transformer 5100 is as follows: each center-tapped transformer occupies 6 pins out of the 24 pins of the transformer A 5100. The first transformer 5100A has a primary coil 5100 AP and a secondary coil 5100 AS. The primary coil 5100AP includes a top pin 5124, a center-tapped pin 5123, and a bottom pin 5122. The secondary 5100AS includes a top pin 5101, a center-tapped pin 5102, and a bottom pin 5103. Similarly, the second transformer 5100B of the first signal transformer 5100 has a primary coil 5100BP and a secondary coil 5100BS. The primary 5100BP includes a top pin 5121, a center-tapped pin 5120, and a bottom pin 5119. The secondary coil 5100BS includes a top pin 5104, a center-tapped pin 5105, and a bottom pin 5106. The transformer 5100C of the input transformer A 5100 has a primary coil 5100CP and a secondary coil 5100CS. The primary coil 5100CP includes a top pin 5118, a center-tapped pin 5117, and a bottom pin 5116. The secondary coil 5100 CS includes a top pin 5107, a center-tapped pin 5108, and a bottom pin 5109. The fourth transformer 5100D of the first signal transformer 5100 has a primary coil 5100DP and a secondary coil 5100DS. The primary coil 5100DP includes a top pin 5115, a center-tapped pin 5114, and a bottom pin 5113. The secondary 5100DS includes a top pin 5110, a center-tapped pin 5111, and a bottom pin 5112.

Within the first signal transformer 5100, the primary coil of the first transformer 5100AP, the primary coil of the second transformer 5100BP, and the secondary coil of the second transformer 5100CS are coupled together to form a center-tapped transformer with the PTSR of 1:1 in the following manner: the bottom pin 5122 of the first transformer 5100A is coupled to the center-tapped pin 5120 of the second transformer 5100B. The top pin 5104 of the secondary 5100BS of the second transformer 5100B is coupled to the electrical ground 5900.

The top pin 5121 of the primary 5100BP of the first transformer 5100B is coupled to pin 5046 of the first signal connector 5040, and the bottom pin 5119 of the primary coil 5100BP is coupled to pin 5043 of the first signal connector 5040.

The primary coil of the third transformer 5100CP, the primary coil of the fourth transformer 5100DP, and the secondary coil of the fourth transformer 5100CS are coupled together to form a center-tapped transformer with the PTSR of 1:1 in the following manner: the top pin 5115 of the fourth transformer 5100D is coupled to the center-tapped pin 5117 of the third transformer 5100C. The top pin 5107 of the secondary 5100CS of the third transformer 5100C is coupled to the electrical ground 5900.

The top pin 5118 of the primary coil 5100CP of the third transformer 5100C is coupled to pin 5042 of the first signal 5040, and the bottom pin 5116 of the primary coil 5100CP is coupled to pin 5041 of the first signal 5040.

The second signal transformer 5200 is an IC type transformer that has 24 pins and contains four center-tapped transformers 5200A, 5200B, 5200C, and 5200D, respectively. The pin-out of the transformer B 5200 is as follows: each center-tapped transformer occupies 6 pins out of the 24 pins of the second signal transformer 5200. The first transformer 5200A has a primary coil 5200AP and a secondary coil 5200AS. The primary coil 5200AP includes a top pin 5224, a center-tapped pin 5223, and a bottom pin 5222. The secondary coil 5200 AS includes a top pin 5201, a center-tapped pin 5202, and a bottom pin 5203. Similarly, the second transformer 5200B of the second signal transformer 5200 has a primary coil 5200BP and a secondary coil 5200BS. The primary coil 5200BP includes a top pin 5221, a center-tapped pin 5220, and a bottom pin 5219. The secondary coil 5200 BS includes a top pin 5204, a center-tapped pin 5205, and a bottom pin 5206. The transformer 5200C of the second signal transformer 5200 has a primary coil 5200CP and a secondary coil 5200CS. The primary coil 5200CP includes a top pin 5218, a center-tapped pin 5217, and a bottom pin 5216. The secondary coil 5200 CS includes a top pin 5207, a center-tapped pin 5208, and a bottom pin 5209. The fourth transformer 5200D of the second signal transformer B 5100 has a primary coil 5200DP and a secondary coil 5200DS. The primary coil 5200DP includes a top pin 5215, a center-tapped pin 5214, and a bottom pin 5213. The secondary coil 5200 DS includes a top pin 5210, a center-tapped pin 5211, and a bottom pin 5212.

Within the second signal transformer 5200, the primary coil of the first transformer 5200AP, the primary coil of the second transformer 5200BP, and the secondary coil of the second transformer 5200CS are coupled together to form a center-tapped transformer with the PTSR of 1:1 in the following manner: the bottom pin 5222 of the first transformer 5200A is coupled to the center-tapped pin 5220 of the second transformer 5200B. The top pin 5204 of the secondary coil 5200BS of the second transformer 5200B is coupled to the electrical ground 5900.

The top pin 5221 of the primary coil 5200BP of the first transformer 5200B is coupled to pin 5036 of the second signal port 5030, and the bottom pin 5219 of the primary coil 5200BP is coupled to pin 5033 of the second signal connector 5030.

The primary coil of the third transformer 5200CP, the primary coil of the fourth transformer 5200DP, and the secondary coil of the fourth transformer 5200CS are coupled together to form a center-tapped transformer with the PTSR of 1:1 in the following manner: the top pin 5215 of the fourth transformer 5200D is coupled to the center-tapped pin 5217 of the third transformer 5200C. The top pin 5207 of the secondary coil 5200CS of the third transformer 5200C is coupled to the electrical ground 5900.

The top pin 5218 of the primary 5200CP of the third transformer 5200C is coupled to pin 5032 of the input A 5030, and the bottom pin 5216 of the primary 5200CP is coupled to pin 5031 of the input A 5030. The DC electrical power 5930 connects the top pin 5124 to the first signal transformer 5100 to he top pin 5224 of the second signal transformer 5200. The DC electrical power 5930 also connects the bottom pin 5113 and the first signal transformer 5100 to the bottom pin 5213 of the second signal transformer 5200.

The first tap transformer 5300 is also an IC type transformer that has 24 pins and contains four center-tapped transformers 5300A, 5300B, 5300C, and 5300D, respectively. The pin-out of the first transformer 5300 is as follows: each center-tapped transformer occupies 6 pins out of the 24 pins of the tap-transformer B 5300. The first transformer 5300A has a primary coil 5300AP and a secondary coil 5300AS. The primary 5300AP includes a top pin 5324, a center-tapped pin 5323, and a bottom pin 5322. The secondary coil 5300 AS includes a top pin 5301, a center-tapped pin 5302, and a bottom pin 5303. Similarly, the second transformer 5300B of the tap-transformer B 5300 has a primary coil 5300BP and a secondary coil 5300BS. The primary coil 5300BP includes a top pin 5321, a center-tapped pin 5320, and a bottom pin 5319. The secondary 5300 BS includes a top pin 5304, a center-tapped pin 5305, and a bottom pin 5306. The transformer 5300C of the tap-transformer B 5300 has a primary coil 5300CA and a secondary coil 5300CS. The primary coil 5300CP includes a top pin 5318, a center tap pin 5317, and a bottom pin 5316. The secondary coil 5300CS includes a top pin 5307, a center-tapped pin 5308, and a bottom pin 5309. The fourth transformer 5300D of the tap-transformer B 5300 has a primary coil 5300DP and a secondary coil 5300DS. The primary 5300DP includes a top pin 5315, a center-tapped pin 5314, and a bottom pin 5313. The secondary coil 5300 DS includes a top pin 5310, a center tap pin 5311, and a bottom pin 5312.

Within the first tap-transformer 5300, the top pin 5321 of the primary coil 5300BP of the second transformer 5300B is coupled to pin 5026 of the second tap port 5020. The center-tapped pin 5320 of the same transformer is coupled to pin 5025 and 5024 of the first tap port 5020; and the bottom pin 5319 is connected to pin 5023 of the first tap port 5020. The top pin 5318 and the bottom pin 5316 of the third transformer 5300CP are connected to pin 5022 and 5021 respectively. The center-tapped pin 5317 is coupled to the electrical ground 5900. On the secondary side, the top pin 5304 of the second transformer 5300BS is coupled to the electrical ground 5900. Thus, within the first tap transformer 5300, the second transformer 5300B has the PTSR of 1:1.

The second tap transformer 5400 is also an IC type transformer that has 24 pins and contains four center-tapped transformers 5400A, 5400B, 5400C, and 5400D, respectively. The pin-out of the first tap transformer 5400 is as follows: each center-tapped transformer occupies 6 pins out of the 24 pins of the transformer D 5400. The first transformer 5400A has a primary coil 5400AP and a secondary coil 5400AS. The primary coil 5400AP includes a top pin 5424, a center-tapped pin 5423, and a bottom pin 5422. The secondary coil 5400 AS includes a top pin 5401, a center-tapped pin 5402, and a bottom pin 5403. Similarly, the second transformer 5400B of the second tap transformer 5400 has a primary coil 5400BP and a secondary coil 5400BS. The primary coil 5400BP includes a top pin 5421, a center-tapped pin 5420, and a bottom pin 5419. The secondary coil 5400 BS includes a top pin 5404, a center-tapped pin 5405, and a bottom pin 5406. The transformer 5400C of the second tap transformer 5400 has a primary 5400CP and a secondary 5400CS. The primary coil 5400CP includes a top pin 5418, a center-tapped pin 5417, and a bottom pin 5416. The secondary coil 5400CS includes a top pin 5407, a center-tapped pin 5408, and a bottom pin 5409. The fourth transformer 5400D of the second tap transformer 5400 has a primary coil 5400DP and a secondary coil 5400DS. The primary coil 5400DP includes a top pin 5415, a center-tapped pin 5414, and a bottom pin 5413. The secondary 5400 DS includes a top pin 5410, a center-tapped pin 5411, and a bottom pin 5412.

Within the second tap-transformer 5400, the top pin 5421 of the primary coil 5400BP of the second transformer 5400B is coupled to pin 5016 of the second tap port 5010. The center tap pin 5420 of the same transformer is coupled to pin 5015 and 5014 of the second tap port 5010; and the bottom pin 5419 is connected to pin 5013 of the second tap port 5010. The top pin 5418 and the bottom pin 5416 of the third transformer 5400CP are connected to pin 5012 and 5011 respectively. The center-tapped pin 5417 is coupled to the electrical ground 5900. On the secondary side, the top pin 5404 of the second transformer 5400BS is coupled to the electrical ground 5900. Thus, within the second tap transformer 5400, the second transformer 5400B has the PTSR of 1:1.

The first relay 5500 and the second relay 5600 are of the same type. Each relay has two single-pole double-throw (SPDT) switches with two input terminals and 4 output terminals as described in FIG. 4. Terminals 3 and 8 are two input terminals and 2, 4, 7, and 9 are output terminals. The first relay 5500 has two input terminals 5503 and 5508 with four output terminals 5502, 5504, 5507, and 5509. The input terminal 5503 switches between the output 5502 and 5504; while the input terminal 5508 switches between the output 5507 and 5509. The second relay 5600 has two input terminals 5603 and 5608 with four output terminals 5602, 5604, 5607, and 5609. The input terminal 5603 switches between the output 5602 and 5604; while the input terminal 5608 switches between the output 5607 and 5609.

The input terminal 5503 of the first relay 5500 is coupled to the bottom pin 5109 of the secondary coil of the third transformer 5100CS, and the input terminal 5508 is coupled to the bottom pin 5209 of the secondary coil 5200CS of the third transformer 5200C of the second signal transformer 5200. The output pins 5502, 5504, and 5509 are coupled together and to a first terminal 5530A of the resistor 5530. A second terminal 5530B of the resistor 5530 is coupled to the electrical ground 5900. Thus, the input terminal 5503 has only one value regardless of what output it switches to because the output pins 5502 is coupled to the output terminals 5504, and 5509.

The input terminal 5603 of the second relay 5600 is coupled to the bottom pin 5206 of the secondary coil of the second transformer 5200BS, and the input pin 5608 is coupled to the bottom pin 5106 of the secondary coil 5100BS of the second transformer 5100B of the first signal transformer 5100. The output terminals 5602, 5604, and 5609 are coupled together and to a first terminal 5630A of the resistor 5630. A second terminal 5630B of the resistor 5630 is coupled to the electrical ground 5900. Thus, the input terminal 5603 has only one value regardless of what output it switches to because the output pins 5602 is coupled to the output pin 5604, and pin 5609.

Both first and second relays 5500 and 5600 are controlled by a second power 5940. When the power 5940 is down, the first relay 550 and the second relay 5600 switch to bypass the op-amp 5700 and 5800. On the other hand, when the power 5940 is up the first and second relays 5500 and 5600 respectively, switch to connect the op-amps.

The op-amps 5700 and 5800 each is an 8-pin IC. The VIN− is pin 2 and the VIN+ is pin 3. The output VO is pin 8. The power supply is pin 7 and the ground is pin 1. The op-amp 5700 has a negative input terminal VIN− 5702, and a positive input terminal VIN+ 5703, and an output terminal VO 5706. Similarly, the op-amp 5800 has an input terminal VIN− 5802, a positive input terminal VIN+ 5803, and an output terminal VO 5806. Both negative input terminals 5702 and 5802 are coupled to the electrical ground 5900. Both power supply pins 5707 and 5807 are coupled to the second power 5940 of 10 VDC.

The positive input terminal VIN+ 5703 of the op-amp 5700 is coupled to the output pins 5502, 5504 and 5509 of the relay D3 5500 and to the first terminal 5530A of the resistor 5530. The output pin 5507 of the relay D3 5500 is coupled to a first terminal 5710A of the resistor 5710; a second terminal 5710B of the resistor 5710 is coupled to the output pin VO 5706 of the op-amp 5700 and to a first terminal 5720A of the resistor 5720. A second terminal 5720B of the resistor 5720 is coupled to the bottom pin 5306 of the secondary 5300BS of the second transformer 5300B of the second tap transformer 5300.

In the same fashion, the positive terminal VIN+ 5803 of the op-amp 5800 is coupled to the output pins 5602, 5604, and 5609 of the relay D4 5600 and to the first terminal 5630A of the resistor 5630. The output pin 5607 of the relay D4 5600 is coupled to a first terminal 5810B of a resistor 5810; a second terminal 5810A of the resistor 5810 is coupled to the output pin 5806 of the op-amp 5800 and to a first terminal 5820A of a resistor 5820. A second terminal 5820B of the resistor 5820 is coupled to the bottom pin 5406 of the secondary coil 5400BS of the second transformer 5400B of the first tap transformer 5400.

The above is a description of the manner the in-line power tap device 5000 is connected together. In the case where the first communicating node 102 connected to he first signal port 5040 and the second communicating node connected to the second signal port 5030, pins 5041 and 5042 of the first signal port 5040 are transmitted signals from the first node 102 to the second node 106, or TRANS+ data signal; and, pins 5031 and 5032 of the second signal port 5030 are received data signals at the second node 106, or RECEIV+ data signal. Pins 5033, and 5036 of the second signal port 5030 transmit signals from the opposite direction from the second communicating node 106 to the first communicating node 102, or TRANS− data signal; whereas pins 5043, 5046 of the first signal port 5040 are received signals, or RECEIV− data signal.

When a signal TRANS+ data signals is transmitted from the first communicating node 102, the first signal port 5040 observes these signals at pin 5041 and pin 5042. Turning to FIG. 5 and to the connection descriptions above, the following happens:

First, the signal transformer pairs 5100B and 5100C couple the TRANS+ data signal at the top pin 5121 into the primary coil at pins 5116 and 5118. While the in-line power is passed from the first signal port 5040 to the second signal port 5030 via the power line 5930 connecting pin 5113 to pin 5213. The data signal TRANS+ at pin 5109 is same as that of the original TRANS+ signal because the primary to secondary ratio is 1:1. The TRANS+ data signal of the same amplitude is then fed to the input port 5503 of the first relay 5500.

In the meantime, RECEIV+ data signals are observed at pins 5031 and 5032 of the second signal port 5030. This RECEIV + data signal is coupled to the third transformer 5200C. At the output pin 5209 of the secondary coil 5200CS of the third transformer 5200C, the RECEIV+ data signal's amplitude remains the same because the PTSR of the third and fourth transformer 5200C and 5200D is 1:1. RECEIV+ data signals are fed to the input port 5508 of the first relay 5500.

Second, both first and second relays 5500 and 5600 are controlled by a second power 5940. When the power 5940 is down, the first relay 550 and the second relay 5600 switch to bypass the op-amps 5700 and 5800. On the other hand, when the power 5940 is up the first and second relays 5500 and 5600 respectively, switch to connect the op-amps. Within the first delay 5500, the input terminal 5508 is switched to the output 5509 and the input terminal 5503 is switched to the position pin 5504. Therefore, both TRANS+/RECEIV+ data signals appear at the positive input VIN+ 5703 of the op-amp 5700. Because the gain of the op-amp 5700 is set at 2, the output data signals TRANS+/RECEIV+ signals at the output terminal 5706 of the op-amp 5700 are now twice their original values.

The TRANS+/RECEIV+ data signals at the second terminals of the resistors 5710 and 5720 are restored to their original amplitude. The TRANS+/RECEIV+ data signals are received at pin 5306 of the secondary coil 5300BS and coupled to the primary coil 5300BP of the second tap transformer 5300 at pins 5319, 5320 and 5321. Finally, because the primary to secondary ratio of the second transformer 5300 is 1:1, the TRANS+/RECEIV+ data signals at pins 5321 and 5319 are at the same amplitude as the original signal data. Thus, from either pin 5023 or pin 5026 of the first tap port 5020 to the electrical ground 5900 (or pins 5024 and 5035), the second tap transformer splits the TRANS+/RECEIV+ signals at pin 5023 and pin 5026. In another word, the TRANS+ data signals at the first communicating node 102 can be monitored at pin 5023, and the RECEIV+ signals at the second communicating node 106 can be monitored at pin 5026 or vice versa.

When the power source 5940 is down, the input 5508 is switched to the output 5507 of the first relay 5500, and, the first 5503 switches to 5502, thus bypassing the op-amp 5700. Thus, the first relay 5500 guarantees that the TRANS+/RECEIV+ signals always passed through from the first communicating node 102 to the second communicating node 106 and vice versa.

When the second communicating node 106 transmits and the first communicating node 102 receives, pins 5033 and 5036 of the second signal port 5030 are TRANS− data signals, and pins 5043, 5046 of the input port 5040 are RECEIV− data signal. During this cycle, the following happens:

First, the TRANS− data signal is coupled to pins 5219 and 5220 of the primary coil 5100BP and appears at pin 5206 of the second transformer 5200B of the transformer 5200. Again, because the primary to secondary ratio of this transformer is 1:1, the output TRANS− at pin 5206 is equal in amplitude. The in-line power is passed from the first signal connector 5040 to the second signal connector 5030 by the power line 5930 connecting pin 5124 the first signal transformer 5100 to the pin 5224 of the second signal transformer 5200. The RECEIV− data signal appears at pin 5106 of the second transformer 5100BS. The TRANS− data signal is coupled to the input pin 5603 and the RECEIV− data signal is coupled to the input terminal 5608 of the second relay 5600. Second, the input 5608 is switched to the output 5609 or the positive terminal VIN+ 5803 of the op-amp 5800. The input 5603 is also switched to the positive terminal VIN+ 5802 so that the TRANS− and RECEIV− signals are input to the op-amp 5800. At the output 5806 of the op-amp 5800, the TRANS−/RECEIV− signals are amplified by 3 dB. Similarly to the TRANS+/RECEIV+ case, TRANS− and RECEIV− data signals are restored to their original values of the second terminal 5820B of the resistor 5820 and coupled to the second tap-transformer 5400 via the secondary coil 5400BS of the second transformer 5400B. The TRANS− and RECEIV− data signals can be monitored at pins 5012 and 5016 of the second tap port 5010.

When the power source 5940 is down, the input 5608 is switched to 5607 and the input 5603 is switched to 5602, bypassing the op-amp 5800. Thus, the second relay 5600 guarantees the TRANS−/RECEIV− signals are always passed through the device 200 from the first communicating node 102 to the second communicating node 106.

In the case where the first communicating node 102 is connected to the second signal port 5030 and the second communicating node 106 is connected to the first signal port 5040, the analysis is the same as above.

What is claimed is:

1. An in-line power tap device for a data communication network, comprising:
  a plurality of signal ports coupled to communicating nodes of the data communication network, wherein each signal port has a plurality of pins;
  at least one tap port coupled to a plurality of signal ports for monitoring data signals, wherein each tap port has a plurality of pins; and means for transmitting the data signals between communicating nodes, wherein the data signals are transmitted between the pins of the plurality of the signal ports and monitored on the pins of at least one tap port; and means for passing in-line power between the communicating nodes of the data communication network.

2. The in-line power tap device of claim 1, wherein the means for transmitting the data signals further comprises:

a first plurality of signal transformers each having a primary terminal, a secondary terminal, and a center-tapped terminal, wherein the primary terminals are coupled to the pins of the plurality of signal ports and the center-tapped terminals are coupled to the means for passing the DC electrical power;

a plurality of amplifiers each having a negative input terminal, a positive input terminal, and an output terminal; wherein the positive input terminals are coupled to the secondary terminals of the first plurality of signal transformers and wherein the negative input terminals are coupled to an electrical ground;

a second plurality of signal transformers each having a primary terminal, a secondary terminal, and a center-tapped terminal; wherein the primary terminals are coupled to the output terminals of the plurality of amplifiers, the secondary terminals are coupled to the pins of the plurality of signal ports, and the center-tapped terminals are coupled to the means for passing the in-line power; and a plurality of tap transformers each having a primary terminal and a secondary terminal; wherein the primary terminal are coupled to the output terminals of the plurality of amplifiers and secondary terminals are coupled to the pins of the plurality of the signal ports.

3. The in-line power tap device of claim 1, wherein means for transmitting the data signals further comprises:

a first plurality of signal transformers each having a primary terminal, a secondary terminal, and a center-tapped terminal, wherein the primary terminals are coupled to the pins of the plurality of signal ports and the center-tapped terminals are coupled to the means for passing the DC electrical power;

a plurality of amplifiers each having a positive input terminal, a negative input terminal, and an output terminal, wherein the positive input terminals are coupled to the secondary terminals of the first plurality of signal transformers and wherein the negative input terminal is coupled to an electrical ground;

a second plurality of signal transformers each having a primary terminal, a secondary terminal, and a center-tapped terminal; wherein the primary terminals are coupled to the outputs of the plurality of amplifiers, the secondary terminals are coupled to the pins of the plurality of signal ports, and the center-tapped terminals are coupled to the means for passing DC electrical power;

a plurality of tap transformers each having a primary terminal and secondary terminal; wherein the primary terminals are coupled to the outputs of the plurality of amplifiers and secondary terminals are coupled to the pins of the plurality of the signal ports; and a plurality of relays coupled to the first plurality of signal transformers and the second plurality of signal transformers so that the data signals bypass the plurality of amplifiers when a power source of the plurality of the amplifiers is cutoff.

4. The in-line power tap device of claim 1 wherein the means for passing in-line power comprises a plurality of power lines.

5. The in-line power tap device of claim 1 wherein the data communication network is an Ethernet communication network.

6. The in-line power tap device of claim 2 wherein each of the plurality of amplifiers has a gain and the gain being set so that the amplitudes of the data signals at each of the plurality of signal ports have an equivalent amplitude.

7. The in-line power tap device of claim 3 wherein each of the plurality of the amplifiers has a gain and the gain being set so that the amplitudes of the data signals at each of the plurality of signal ports have an equivalent amplitude.

8. The in-line power tap device of claim 3, wherein the plurality of relays further comprises a plurality of single-pole double-throw (SPDT) switches.

9. The in-line power tap device of claim 3, wherein the first signal transformer, the second signal transformer, the first tap transformer and the second tap transformer has the primary to secondary ratio of 1.

10. The in-line power tap device of claim 3, wherein the first and second amplifier have a gain of at least 2.

11. An in-line power tap device for a data communication network, comprising:

a first signal port having a plurality of pins coupled to a first node of the data communication network;

a second signal port having a plurality of pins coupled to a second node of the data communication network;

a tap port having a plurality of pins coupled to the second signal port; and means for transmitting data signals between the first signal port and the second signal port; wherein the data signals are transmitted between the first signal port and the second signal port and the data signals are monitored at the tap port; and means for passing in-line power between the first signal port and a second signal port.

12. The means for transmitting data signals in claim 11 further comprises:

a first signal transformer having an primary terminal, a center-tapped terminal and a secondary terminal;

an amplifier having a positive input terminal, a negative terminal, and an output terminal, wherein the input terminal is coupled to the secondary terminal of the first signal transformer and the negative input terminal is coupled to an electrical ground;

a second signal transformer having an primary terminal, a center-tapped terminal, and secondary terminal, wherein the primary terminal is coupled to the output terminal of the amplifier; and wherein the center-tapped terminal is coupled to the means for passing the DC electrical power; and a tap transformer having a primary terminal and a secondary terminal, wherein the primary terminal of the tap transformer is coupled to the output of the amplifier for monitoring the data signals.

13. The in-line power tap device of claim 12, wherein the first signal connector, the second signal connector, the first tap connector, and the second tap connector are a standard 8-pin RJ-45 type connector.

14. The means for transmitting the data signals as in claim 12, further comprises relay coupled to the first signal transformer and the second signal transformer so that the data signals bypass the amplifier when a power source of the amplifier is cutoff.

15. The means for transmitting the data signals as in claim 14, wherein the relay further comprises a first single-pole double-throw (SPDT) switch and a second single-pole double throw switch (SPDT), wherein each SPDT switch comprises an input terminal and two output terminals; the input terminal of the first SPDT switch is coupled to the secondary terminal of the first signal transformer, and the input terminal of the second SPDT switch is coupled to the secondary terminal of the second signal transformer; wherein the first output of the first SPDT switch is coupled to the positive input terminal of the amplifier and the first output terminal of the second SPDT switch is coupled to the output terminal of the amplifier; and wherein the second output of the first SPDT switch is coupled to the second output of the second SPDT forming a signal path by which the data signals bypass the amplifier.

16. The in-line power tap device of claim 11 wherein the means for passing in-line power between the first signal port and the second signal port comprises a power line.

17. The in-line power tap device of claim 11 wherein the first node is a hub and a second node is a destination of the data communication network.

18. An in-line power tap device for monitoring data signals and for passing a in-line power to a data communication network, comprising:
   a first signal connector;
   a first signal transformer having an input, a center-tapped terminal and a primary terminal, wherein the primary terminal is coupled to the first signal connector;
   a first amplifier having an input terminal and an output terminal, wherein the input terminal of the amplifier is coupled to the output of the first relay;
   a first tap transformer having an primary terminal and a secondary terminal, wherein the input terminal of the first output tap transformer is coupled to the output of the first amplifier;
   a first tap connector coupled to secondary terminal of the first tap transformer;
   a second signal connector;
   a second signal transformer having an primary terminal, a center-tapped terminal and a secondary terminal, wherein the primary terminal is coupled to the second signal connector;
   a first relay having two single-pole double-throw (SPDT) switches connecting to the first signal transformers and the second signal transformers so that the data signals bypass the first amplifier when a power source to the amplifier is cutoff;
   a second relay having two single-pole double-throw (SPDT) switches connecting to the first signal transformers and the second signal transformers so that the data signals can bypass the first amplifier when the power source to the amplifier is cutoff;
   a second amplifier having an input terminal and an output terminal, wherein the input terminal of the amplifier is coupled to the output of the second relay;
   a second tap transformer having an primary terminal and a secondary terminal, wherein the primary terminal of the second tap transformer is coupled to the output terminal of the second amplifier; and
   a second tap connector coupled to the secondary terminal of the second tap transformer; and
   a power line connect the center-tapped terminal of the first signal transformer to the center-tapped terminal of the second signal transformer.

19. The in-line power tap device of claim 18, wherein the DC power lines are coupled to a 48 VDC.

20. The in-line power tap device of claim 18, wherein the signal connectors and the tap connectors are coupled to the Ethernet data communication network by means of a twisted pair.

21. The first relay of claim 18, wherein the first relay further comprises a first single-pole double-throw (SPDT) switch and a second single-pole double-throw (SPDT) switch wherein each SPDT switch comprises an input terminal and two output terminals; wherein the input terminal of the first SPDT switch is coupled to the secondary terminal of the first signal transformer and the input terminal of the second SPDT switch is coupled to the secondary terminal of the second signal transformer; wherein the first output of the first output terminal of the second SPDT switch is coupled to the output terminal of the amplifier; and wherein the second output of the first SPDT switch is coupled to the second output of the second SPDT forming a signal path by which the data signals bypass the first amplifier.

22. The second relay of claim 18, wherein the second relay further comprises a first single-pole double-throw (SPDT) switch and a second single-pole double-throw (SPDT) switch wherein each SPDT switch comprises an input terminal and two output terminals; wherein the input terminal of the first SPDT switch is coupled to the secondary terminal of the first signal transformer and the input terminal of the second SPDT switch is coupled to the secondary terminal of the second signal transformer; wherein the first output of the first SPDT switch is coupled to the positive input terminal of the amplifier and the first output terminal of the second SPDT switch is coupled to the output terminal of the amplifier, and wherein the second output of the first SPDT switch is coupled to the second output of the second SPDT forming a signal path by which the data signals bypass the second amplifier.

* * * * *